Nov. 30, 1954   R. CALZOLARI   2,695,530
FRICTIONAL ENDLESS BELT DRIVE
Filed March 20, 1951

INVENTOR.
RINO CALZOLARI
BY
Richardson, David and Nordon

# United States Patent Office 2,695,530
Patented Nov. 30, 1954

2,695,530

FRICTIONAL ENDLESS BELT DRIVE

Rino Calzolari, Fornello, Lamporecchio, Pistoia, Italy

Application March 20, 1951, Serial No. 216,518

Claims priority, application Italy April 15, 1950

2 Claims. (Cl. 74—232)

The present invention relates to frictional endless belt drives suitable for interconnecting a driving pulley and a driven pulley, and more particularly to belt drives of this character having increased power transmission capacity.

Among the objects of the invention is the provision of a frictional belt drive providing improved performance with respect to heating, slippage and power transmission capacity.

According to the present invention, means are provided for the use of an arrangement whereby a high driving capacity is obtained in the belts, whether they be of the flat type or of the V type or of any other type or design, at the same time avoiding the use of turnbuckles or stretchers, which have several disadvantages.

The arrangement, according to the invention, essentially provides for the construction of the driving belt in a plurality of elements or layers, positively interengaging one another, and having a different moduli of elasticity, said elements or layers being, under conditions of rest, subjected to different initial stresses.

The belts according to the invention comprise at least one inner traction layer having a high modulus of elasticity and thus resisting stretching, although practically sustaining the entire burden of the tensile stress required for the operation of the drive. Said relatively inelastic traction layer which has a high modulus of elasticity, is in direct frictional engagement with the driving and driven pulleys, and will therefore have a flat or V cross-section or any other cross-sectional configuration appropriate for engagement with the pulleys. Said inner relatively inelastic traction layer is surrounded by at least one outer tension layer or element having a relatively high elastic deformation under tensile stress, for instance, a material having an appreciably lower modulus of elasticity than the inner layer. Said outer layer is thus more readily susceptible to elastic deformation than the inner traction layer of the belt, the outer tension layer being mounted on the inner traction layer. The belt drive is thus made up of the relatively inelastic inner layer, which may be given a given predetermined initial tension, if desired, and the relatively elastic outer layer, positively interengaging means being provided to prevent continuous relative movement between the inner and outer layers, whereby friction and the accompanying heating is avoided, which heating would otherwise occur if continuous slippage of one belt layer relative to the other layer were permitted.

The outer relatively elastic tension layer may comprise an endless continuous member under tension, or it may comprise a resilient system which translates some other type of stress such as torsion, compression, or bending into a resultant effective longitudinal tensional elasticity.

A frictional belt drive in accordance with the invention conforms to the following conditions:

(1) In the power transmitting portion of the belt, which is under tension, the inner and outer layers are simultaneously stretched to the same extent.

(2) In the idle portion of the belt, the relatively inelastic inner traction layer, which has a high tensile modulus of elasticity, must not offer resistance to compression.

(3) The outer relatively resilient layer must be permitted to exert an effective pressure on the belt engaging arcs of the pulleys.

The invention will be better understood from the following specification, together with the accompanying drawing in which certain embodiments of the invention are shown and described.

Referring to the drawing.

Figure 1:
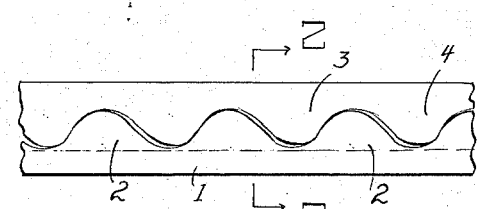
Figure 1 is a fragmentary view in side elevation of a portion of an endless belt embodying the invention.
Figure 2:
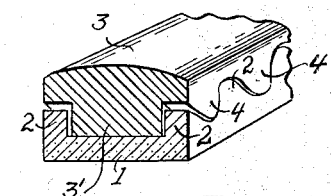
Figure 2 is a perspective view, partly in section taken along the line 2—2 of Fig. 1, looking in the direction of the arrows.

Referring to the embodiment shown in Figs. 1 and 2, the belt comprises a relatively inelastic inner traction layer 1 formed of suitable flexible material having a relatively high tensile modulus of elasticity, the lateral edge portions of the inner belt 1 being formed with a series of spaced undulatory or corrugated outwardly extending sinusoidally shaped projections 2. The relatively resilient outer layer 3 is of T-shaped cross-section and is longitudinally coextensive with the inner layer 1. The relatively resilient outer layer 3 comprises a central core portion 3' which is disposed in a groove formed in the inner layer 1 intermediate the rows of projections 2 of the traction layer 1. The outer tension layer 3 is provided with inwardly extending correspondingly shaped projections 4 formed in the cross arm portion of the T-shape and which fits interengagingly into the recesses between the projections 2 of the inner layer 1. The outer layer 3 is thus centered between the two rows or series of projections 2 of the inner layer 1.

Figure 3:
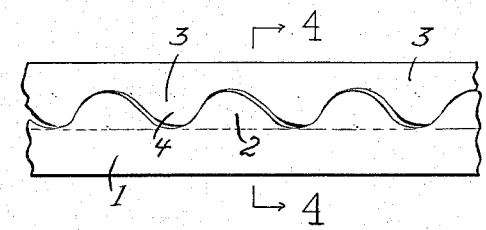
Figure 3 is a fragmentary view in side elevation of a portion of an endless belt showing a modified embodiment of the invention.
Figure 4:
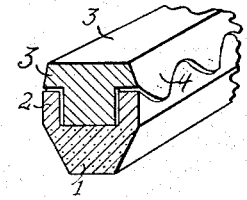
Figure 4 is a perspective view, partly in section taken along the line 4—4 of Fig. 3, looking in the direction of the arrows.

In the embodiment of the invention shown in Figs. 3 and 4, the inner layer 1 is formed with a partially trapezoidal cross-sectional configuration similar to that of a V belt so that it is suitable for use with grooved pulleys.

Figure 5:
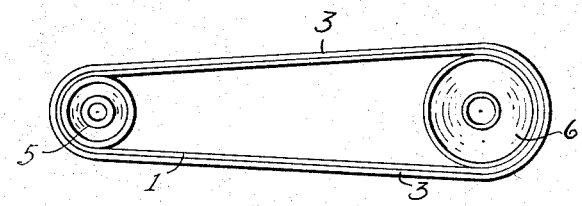
Figure 5 shows a driving pulley and a driven pulley interconnected by a belt in accordance with the invention.

In the illustrated embodiments of the invention, and as shown in Fig. 5, the belt drive comprises the relatively inelastic layer 1 which may be mounted on the pulleys 5 and 6 either with or without a predetermined initial tension. The outer relatively resilient layer 3 is mounted on the inner layer and is stretched, by reason of its low tensile modulus of elasticity, to provide a predetermined initial tension. In operation, the power transmitting portion of the inner layer 1 will stretch due to the tension therein and this will reduce the tension in the idle portion of the belt. In the outer layer 3, however, the low modulus of elasticity will permit a relatively large amount of stretching without appreciably affecting the initial tension. The outer layer 3 thus maintains a practically constant tension both in its power transmitting portion and in its idle portion so that the inner layer 1 is always pressed into engagement with the belt engaging portions of both pulleys, thus enhancing the frictional engagement between the belt and the pulleys which is advantageous for the purpose of the drive.

In the embodiments of the invention illustrated in Figs. 1 to 4, relative movement between the inner and outer belt layers 1 and 3 is prevented by positive interengagement between the projections 2 of the inner belt layer 1 and the projections 4 of the outer belt layer 3. A limited relative displacement between the inner and outer belt layers may occur, due to dimensional differences between the interengaging projections. However, continuous movement or slippage of one belt layer relative to the other with accompanying friction and resultant heating is effectively prevented.

Various modifications in the belt drive described above may be made without departing from the scope of the invention as defined in the appended claims.

What is claimed is:

1. In a belt drive, the combination with a pair of spaced pulleys, one driving and the other driven, of a belt comprising an inner traction layer having a groove formed on its outer surface to receive at least one outer tension-operating layer, a relatively resilient outer tension layer longitudinally coextensive with said inner layer, two rows of outwardly extending projections on said inner layer, said inner layer having recesses between the adjacent projections, two rows of inwardly extending projections on the outer layer, said outer layer having recesses between adjacent projections, the inner layer projections being in engagement with the outer layer recesses and the outer layer projections being in engagement with the inner layer recesses when the layers are in operative position providing positive interengagement between said inner layer and said outer layer at spaced intervals along the belt in order to prevent continuous relative slippage between said two layers.

2. In a belt drive, the combination with a pair of spaced pulleys, one driving and the other driven, of a belt comprising an inner traction layer having a groove formed on its outer surface to receive at least one outer tension layer, a relatively resilient outer tension layer longitudinally coextensive with said inner layer, two rows of outwardly extending projections on said inner layer adjacent to said groove, said inner layer having recesses between the adjacent projections, the recesses and projections of said inner layer having a generally sinusoidal shape, two rows of inwardly extending projections on said outer layer, said outer layer having recesses between adjacent projections, the recesses and projections of said outer layer having a generally sinusoidal shape corresponding to the shape of the recesses and projections of the inner layer, the inner layer projections being in engagement with the outer layer recesses and the outer layer projections being in engagement with the inner layer recesses when the layers are in operative position providing positive interengagement between said inner layer and said outer layer at spaced intervals along the belt in order to prevent continuous relative slippage between said two layers.

References Cited in the file of this patent

UNITED STATES PATENTS

| Number | Name | Date |
|---|---|---|
| 376,975 | Adie | Jan. 24, 1888 |
| 1,635,363 | Handley et all. | July 12, 1927 |
| 2,147,465 | Siegling | Feb. 14, 1939 |

FOREIGN PATENTS

| Number | Country | Date |
|---|---|---|
| 107,805 | Great Britain | July 11, 1917 |
| 186,195 | Great Britain | Sept. 28, 1922 |
| 124,960 | Australia | July 21, 1947 |